(12) United States Patent
Skoulidas et al.

(10) Patent No.: US 8,728,302 B2
(45) Date of Patent: May 20, 2014

(54) SPENT CATALYST RISER DISTRIBUTOR

(75) Inventors: Anastasios Skoulidas, Bristow, VA (US); Alvin U. Chen, Reston, VA (US); Christopher Gordon Smalley, Manassas, VA (US); Robert Frank. Tammera, Warrenton, VA (US); Norihiro Nakashima, Falls Church, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 224 days.

(21) Appl. No.: 13/165,140

(22) Filed: Jun. 21, 2011

(65) Prior Publication Data

US 2011/0315603 A1    Dec. 29, 2011

Related U.S. Application Data

(60) Provisional application No. 61/358,511, filed on Jun. 25, 2010.

(51) Int. Cl.
*C10G 11/00* (2006.01)

(52) U.S. Cl.
USPC .......................... 208/113; 422/129; 422/139

(58) Field of Classification Search
USPC .................... 208/113–124; 422/139, 144
See application file for complete search history.

(56) References Cited

U.S. PATENT DOCUMENTS

| | | | |
|---|---|---|---|
| 4,097,243 A | 6/1978 | Bartholic | |
| 4,397,816 A | 8/1983 | Luckenbach | |
| 4,615,992 A | 10/1986 | Murphy | |
| 5,156,817 A | 10/1992 | Luckenbach | |
| 5,968,460 A | 10/1999 | Eastham et al. | |
| 6,797,239 B1 | 9/2004 | Chen et al. | |
| 7,153,479 B2 | 12/2006 | Peterson et al. | |

(Continued)

FOREIGN PATENT DOCUMENTS

| | | |
|---|---|---|
| DE | 19836397 A1 | 2/2000 |
| EP | 0297762 A1 | 4/1989 |

(Continued)

OTHER PUBLICATIONS

Sadeghbeigi, R. (2012). Fluid Catalytic Cracking Handbook, 3rd ed. Elsevier (Office action cites pp. 252-253).*

*Primary Examiner* — Brian McCaig
(74) *Attorney, Agent, or Firm* — Bruce M. Bordelon; Chad A. Guice

(57) ABSTRACT

The present invention relates to an improved design for use in fluid cracking processes, preferably used in either a fluid catalytic cracking ("FCC") process or a fluid coking process. In particular, the present invention relates to an apparatus and process for improving the separation and distributing spent catalyst and gases in a spent catalyst riser associated with a fluid cracking process, and most preferably for use in a spent catalyst riser associated with an FCC regenerator vessel. A novel catalyst distributor design and associated processes are presented herein which significantly improve combustion in the dense-phase fluidized catalyst bed of a regenerator and results in improved regenerator dense bed combustion and lower migration of oxygen into the regenerator overhead region. As a result, afterburn is significantly reduced in the regenerator and higher catalyst bed temperatures are achieved with significantly more uniform bed temperatures due to the improved combustion characteristics in the dense-phase fluidized catalyst bed.

30 Claims, 10 Drawing Sheets

(56) References Cited

U.S. PATENT DOCUMENTS

| | | |
|---|---|---|
| 2004/0069681 A1 | 4/2004 | Peterson et al. |
| 2005/0163682 A1 | 7/2005 | Jacobs et al. |
| 2008/0220965 A1 | 9/2008 | Santner et al. |

FOREIGN PATENT DOCUMENTS

| | | |
|---|---|---|
| EP | 0622116 A1 | 4/1994 |
| EP | 0773275 A1 | 5/1997 |
| EP | 1036838 A2 | 9/2000 |
| JP | 2006162161 A | 6/2006 |
| JP | 4192362 B2 | 12/2008 |
| WO | 9011824 A1 | 10/1990 |
| WO | 9422568 A1 | 10/1994 |
| WO | 9739282 A1 | 10/1997 |
| WO | 0007714 A1 | 2/2000 |
| WO | 0038822 A1 | 7/2000 |
| WO | 0050165 A1 | 8/2000 |
| WO | 0242394 A2 | 5/2002 |
| WO | 03053558 A2 | 7/2003 |
| WO | 03054115 A1 | 7/2003 |
| WO | 2007076317 A1 | 7/2007 |
| WO | 2007094770 A1 | 8/2007 |
| WO | 2008076787 A1 | 6/2008 |
| WO | 2008080034 A1 | 7/2008 |
| WO | 2008140838 A1 | 11/2008 |
| WO | 2008154995 A1 | 12/2008 |

* cited by examiner

Plan View

Elevation View

Elevation View

Plan View

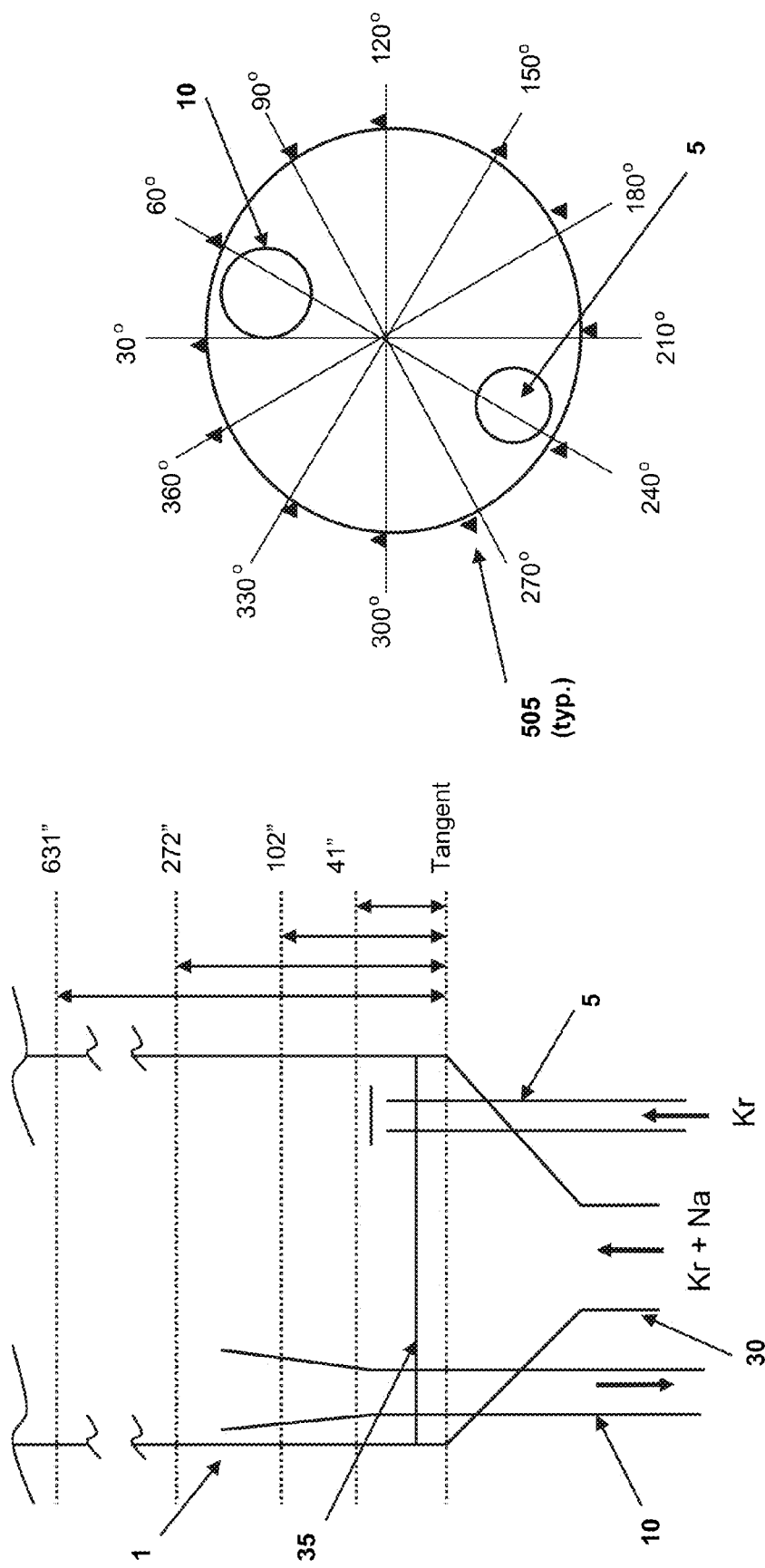

*Air Tracer Breakthrough Time*

*Solids Tracer Breakthrough Time*

CFD Modeling Results – Elevation View

CFD Modeling Results – Plan View (@ top of catalyst bed)

Actual Regenerator Temperatures
(Prior Art "Hat" Design, left-hand side values)
(Present Invention Design, right-hand side values)

SPENT CATALYST RISER DISTRIBUTOR

This application claims the benefit of U.S. Provisional Application No. 61/358,511 filed Jun. 25, 2010.

FIELD OF THE INVENTION

The present invention relates to an improved design for use in fluid cracking processes, preferably used in either a fluid catalytic cracking ("FCC") process or a fluid coking process. In particular, the present invention relates to an apparatus and process for improving the separation and distributing spent catalyst and gases in a spent catalyst riser associated with a fluid cracking process, and most preferably for use in a spent catalyst riser associated with an FCC regenerator vessel.

BACKGROUND OF THE INVENTION

Fluid catalytic cracking processes (or "FCC" processes as used herein) are known in the art and such processes are used primarily for petroleum and petrochemical conversion processes. These processes are valued due to their ability for efficient and selective catalytic cracking of hydrocarbon containing feedstock by fluidizing small catalyst particles and mixing with a feedstock by intimate contact under thermally active conditions to generally produce lower molecular weight "cracked" products. FCC processes are beneficial due to their ability to continuously recycle and regenerate the spent catalysts and to process large volumes of hydrocarbon containing feedstock.

Conversion of high molecular weight petroleum feeds to more valuable products by catalytic processes such as fluidized catalytic cracking are important processes to the petroleum and petrochemical industries. In these fluidized catalytic cracking process, higher molecular weight feeds are contacted with fluidized catalyst particles most advantageously in the riser reactor of the fluidized catalytic cracking unit. The contacting between feed and catalyst is controlled according to the type of product desired. In catalytic cracking of the feed, reactor conditions such as temperature and catalyst circulation rate are controlled to maximize the products desired and minimize the formation of less desirable products such as light gases and coke.

Miscellaneous fluidized catalytic cracking reactor riser and reactor vessel designs have been utilized in the past. However, with the advance of zeolitic cracking catalysts with greatly improved cracking activity, most modern fluidized catalytic cracking reactors utilize a short contact-time cracking configuration. With this configuration, the time in which the catalyst and the fluidized catalytic cracker feedstream are in contact is limited in order to minimize the amount of excessive cracking which results in the increased production of less valued products such as light hydrocarbon gases as well as increased coking deposition on the cracking catalysts.

Most fluidized catalytic cracking configurations utilize a reactor riser cracking configuration wherein the catalyst is contacted with the fluidized catalytic cracker feedstock in a reactor riser, and the catalyst and the hydrocarbon reaction products are separated shortly after the catalyst and hydrocarbon mixture leaves the reactor riser and enters the fluidized catalytic cracking reactor. Although there are many different fluidized catalytic cracking reactor designs in use, most use mechanical cyclones internal to the reactor to separate the catalyst from the hydrocarbon reactor products as quickly and efficiently as possible. This rapid separation process has the benefits of both minimizing post-riser reactions between the catalyst and the hydrocarbons as well as providing a physical means for separating the cracked hydrocarbon products for further processing from the spent catalyst which is regenerated prior to reintroduction of the regenerated catalyst back into the reaction process.

The catalyst that is separated from the cracked hydrocarbon products in the FCC reactor is considered as "spent catalyst" until such time as the catalyst can typically be sent to an FCC regenerator vessel and regenerated into a "regenerated" catalyst. Prior to being regenerated, the spent catalyst is typically stripped of most of the hydrocarbon layer which remains on the catalyst after it is separated from the bulk of the FCC products. This "stripped" catalyst is then sent via a spent catalyst riser to an FCC regenerator, wherein the catalyst is subjected to an oxidizing atmosphere to burn the remaining hydrocarbons and "coke" from the spent catalyst in order to convert it to a regenerated catalyst. These hydrocarbons and coke interfere with the accessibility to the catalytic functioning sites in the catalyst and lower the catalyst's activity, and as such, these deposits must be significantly removed from the spent catalyst before returning the regenerated catalyst back to the catalyst cracking zone of the FCC process. The heat of reaction of the combustion of the coke also directly heats the catalyst and this energy, in the form of a hot catalyst, is used to drive the endothermic cracking reactions in the FCC reactor.

A problem that exists in the industry is that the FCC regenerator operates at very high temperatures and the total capacity of the regenerator unit is very often limited by the temperature in at the top of the FCC regenerator. As many FCC regenerators (but not all) use mechanical cyclones located in the top portion of the regenerator vessels, these temperatures are often referred to as "cyclone temperatures", as often in the design of the FCC regenerators, the thermocouples which measure these temperatures are attached to some or all of the individual cyclones in the FCC regenerator vessel. As such, as used herein the term "cyclone temperatures" will mean the temperature in the top of the regenerator, even if the regenerator does not contain cyclones. This maximum cyclone temperature limit is often the determining limit on the maximum throughput through the regenerator vessel and as such may be a limiting factor to the total production of the FCC unit. In the FCC regenerator, most of the remaining hydrocarbons and coke on the spent catalyst is burned off due to combustion when the hot spent catalyst is exposed to the oxidizing atmosphere (most often significantly comprising air) in the regenerator vessel. The heat of combustion from this reaction causes the regenerator temperatures to rise. As the "cyclone" (or overhead) temperatures approach their maximum allowable operating temperatures, the throughput of the catalyst through the regenerator becomes "temperature limited". These limitations on the cyclone temperatures are usually due to mechanical constraints in the metallurgy and/or refractory of the regenerator vessel and associated internal components.

Much of the excess (and unwanted) temperature in the top of the regenerator (or cyclone temperatures), is due to what is termed as "afterburn". In the regenerator, it is desired that all of the spent catalyst and oxidizing gas (or "oxygen" herein) come in to contact and burn in the lower portion (also called the "bed" or "dense phase") of the regenerator. In this manner, the generated heat is most effectively contained in the bottom of the regenerator where there is a large mass of catalyst in the bed to absorb the heat of combustion. Afterburn occurs when both oxygen and carbon monoxide migrate into the top (or "dilute phase") of the regenerator. In this case, the oxygen and carbon monoxide react and the heat of combustion goes significantly into raising the cyclone temperature since in this top area of the regenerator there is not the mass of the catalyst bed to absorb the generated heat of combustion. This undesired combustion in the dilute phase (i.e., afterburn) increases the cyclone temperatures at the expense to overall throughput.

Afterburn is a significant limiting design and operation factor for FCC units. In order to prevent/minimize the amount of afterburn in the FCC units, the units are either designed for "partial burn" or "full burn" operation. In "partial burn" units, the unit is designed to operate with a deliberate, less than stoichiometric amount of oxygen in the regenerator, thus reducing the risk of oxygen in the dilute phase of the regenerator which can react with carbon monoxide and thereby reducing the amount of afterburn. In contrast, "full burn" units, the unit is designed to operate with a deliberate, more than stoichiometric amount of oxygen in the regenerator, thus reducing the risk of carbon monoxide in the dilute phase of the regenerator which can react with the excess oxygen and thereby reducing the amount of afterburn.

In either case, an operating buffer (i.e., amount excess carbon dioxide or amount excess oxygen) must be utilized to prevent significant afterburn which can cause extensive damage or failure of the regenerator components. The larger the fluctuation in the cyclone temperatures resulting from afterburn in the unit, the larger the operating buffer that must be employed to protect the equipment. However the larger the operating buffer utilized, the larger the impact there is to overall capacity on the regenerator vessel, resulting in lost throughput, capacity and, as a result, lost income.

As such, it is of significant importance that the afterburn and fluctuations in the afterburn be minimized. Minimization of these factors can result in significant financial revenues as well as significantly improve the reliability associated with an FCC unit, in particular as associated with the FCC regenerator vessel and associated equipment.

Additionally, fluid coking is a fluid cracking process family and the fluid coking regenerators are designed and operated in many ways very similar to their FCC regenerator counterparts. One main difference is that the fluid coking processes rely primarily on thermal cracking reactions between the hydrocarbon feed and the catalysts versus the primarily catalytic cracking reactions of an FCC process. This is partially due to the fact that the "catalyst" particles in the fluid coking process are primarily formed of coke particles or other mostly catalytically inert materials which primarily use the heat content in the catalyst to thermally crack the hydrocarbon feed. However, the regenerators in the fluid coking processes are very similar in design and operation as the FCC regenerators and share many of the same problems which the present invention is designed to solve.

While the afterburn problems described above for the FCC regenerators is usually not as significant a concern in the fluid coking regenerators, the same problems of undesired high temperatures in the top of the fluid coking regenerators do exist. Additionally, other problems exist in the fluid coking regenerators due to the incomplete or uneven mixing and burning of the coke from the catalyst particles such as loss of catalyst temperature used for the fluid coking reaction, as well as the excessive generation of small coke particles which get into the overhead flue gas of the fluid coking regenerator causing equipment plugging as well as environmental concerns.

Therefore, there is a need in the industry for equipment and processes to reduce the amount of afterburn and improve the combustion characteristics associated with fluid cracking regenerators, in particular FCC regenerators, and their associated process operations.

SUMMARY OF THE INVENTION

The present invention includes a novel fluid cracking regenerator design incorporating the spent catalyst distributor designs as disclosed herein and associated process operations of such a regenerator.

A preferred embodiment of the present invention is a fluid cracking regenerator vessel, comprising:
a distributor fluidly attached to the discharge end of a spent catalyst riser, wherein the discharge end of a spent catalyst riser is located internal to the fluid cracking regenerator vessel, and wherein the distributor is comprised of:
  a) a top;
  b) a continuous distributor side which is attached to the top of the distributor and extends downwardly from the top of the distributor so as to form a sealed volume between the top of the distributor and the side of the distributor; and
  c) a plurality of distributor tubes which fluidly connect the area at or above the top of the distributor to the area below the top of the distributor.

In a more preferred embodiment of the fluid cracking regenerator vessel is designed for a fluid catalytic cracking process. In another preferred embodiment of the fluid cracking regenerator vessel of the present invention, at least a portion of the distributor tubes extend from a point located at about the top of the distributor at one end of the distributor tube to a point located at about the bottom of the side of the distributor at the other end of the distributor tube.

Another preferred embodiment of the present invention is a fluid cracking process, comprising:
  a) injecting a hydrocarbon feed through one or more feed nozzles connected to a fluid cracking reactor zone;
  b) contacting the hydrocarbon feed with a hot fluidized catalyst in the fluid cracking reactor zone to produce a cracked hydrocarbon product and a reaction catalyst;
  c) separating at least a portion of the cracked hydrocarbon product from the reaction catalyst; wherein the reaction catalyst contains hydrocarbon residue and coke products;
  d) stripping at least a portion of the reaction catalyst with a stripping fluid to remove at least a portion of the hydrocarbon residue from the reaction catalyst thereby producing a spent catalyst;
  e) passing at least a portion of the spent catalyst with a lift gas through a spent catalyst line to a spent catalyst riser;
  f) contacting the spent catalyst and lift gas exiting the spent catalyst riser with a distributor; and
  g) separating at least a portion of the spent catalyst from the lift gas through the distributor;
wherein the distributor is fluidly attached to the discharge end of a spent catalyst riser, and the distributor is located in the dense phase catalyst bed of a fluid cracking regenerator vessel, and the distributor is comprised of:
  a top;
  a continuous distributor side which is attached to the top of the distributor and extends downwardly from the top of the distributor so as to form a sealed volume between the top of the distributor and the side(s) of the distributor; and
  a plurality of distributor tubes which fluidly connect the area at or above the top of the distributor to the area below the top of the distributor.

In a most preferred embodiment of the present invention, the fluid cracking process is a fluid catalytic cracking process. Even more preferably, the fluid catalytic cracking process is operated under partial burn conditions.

BRIEF DESCRIPTION OF THE FIGURES

FIG. 5A is a schematic illustrate the tracer detector elevation positions for the testing in Example 1.

FIG. 5B is a schematic illustrate the tracer detector circumferential positions for the testing in Example 1.

DETAILED DESCRIPTION OF THE INVENTION

The present invention relates to a new design for use in fluid cracking processes. As defined herein, a "fluid cracking process" is any process used for cracking of hydrocarbon molecules into lower molecular weight hydrocarbon molecules by the contact of a hot particle (or "catalyst") followed by a step for separation of at least a portion of the spent hot particles and the lower molecular weight hydrocarbon products. As defined herein, both "fluid catalytic cracking (or "FCC") processes" and "fluid coking processes" are subsets of "fluid cracking processes". A "fluid catalytic cracking (or "FCC") process" is defined herein as a process which contacts fluidized hot particles (or "catalysts") with a hydrocarbon stream to produce lower molecular weight hydrocarbon products wherein the hot particles, or catalysts, contain active metals which produce substantially catalytically cracking reactions in the process. A "fluid coking process" is defined herein as a process which contacts fluidized hot particles (or "catalysts") with a hydrocarbon stream to produce lower molecular weight hydrocarbon products wherein the hot particles, or catalysts, drive substantially thermal cracking reactions in the process.

In it most preferred embodiment, the present invention relates to an apparatus and process for improving the separation and distributing spent catalyst and gases from a spent catalyst return riser associated with a fluid catalytic cracking ("FCC") process, in particular for improving the separation and distributing of spent catalyst and gases from a spent catalyst riser associated with an FCC regenerator vessel. The present invention results in improved process performance and mechanical reliability of an FCC unit.

Figure 1:
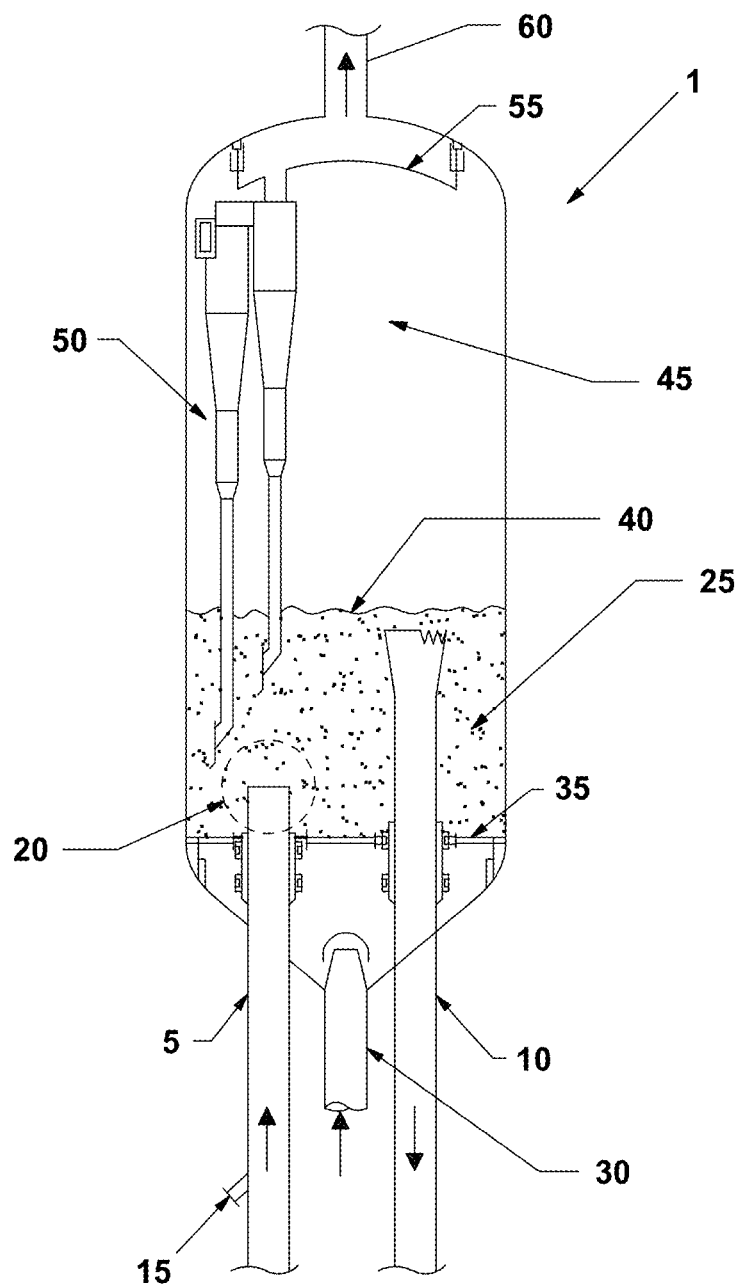
FIG. 1 is simplified schematic of a configuration of a FCC regenerator.

FIG. 1 shows a typical FCC regenerator vessel arrangement. As noted prior, the present invention can work in any fluid catalytic cracking regenerator with an internal spent catalyst riser. Here, a simplified cross-sectional schematic of a regenerator vessel (1) is shown. The regenerator is generally comprised of a spent catalyst line (5) and a regenerated catalyst line (10). The portion of the spent catalyst line that is inside of the regenerator is often referred to as the "spent catalyst riser", and similarly, the portion of the regenerated catalyst line that is inside of the regenerator is often referred to as the "regenerated catalyst riser". As used herein, the terms "catalyst line" or "catalyst riser" may be used interchangeable when referring to the portion of the spent or regenerated catalyst line that is located inside the regenerator vessel. Continuing with FIG. 1, the spent catalyst line (5) contains a flow of "spent" catalyst from a fluid catalytic cracking vessel (not shown) wherein the catalyst is typically lifted in a flow of gases, sometimes referred to as a "lift gas" (15) to produce fluidization of the catalyst for flow. These lift gases can be comprised of air or inert gases, but are preferably comprised of air. The lift gas (15) may also be injected in multiple locations in the spent catalyst line (5) line into the regenerator (1) to further control the amount of flow and combustion.

Figure 2:
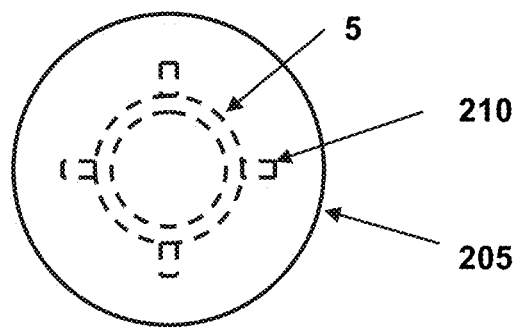
FIG. 2 illustrates a spent catalyst distributor of the prior art (plan and elevation views).
Figure 2:
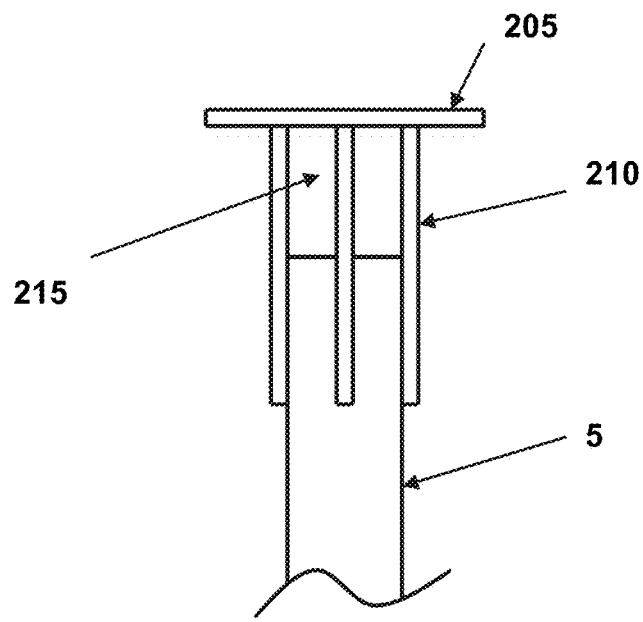
Figure 3:
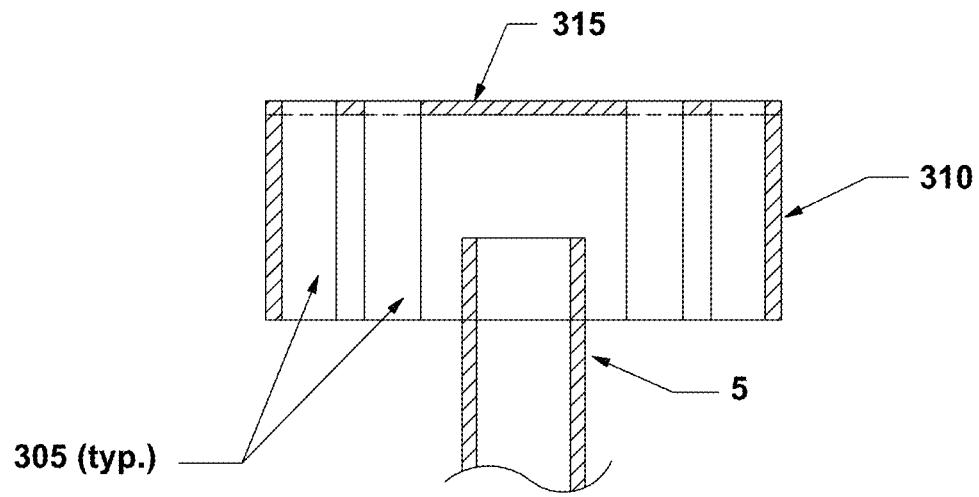
FIG. 3 illustrates an embodiment of a spent catalyst distributor of the present invention (plan and elevation views).
Figure 3:
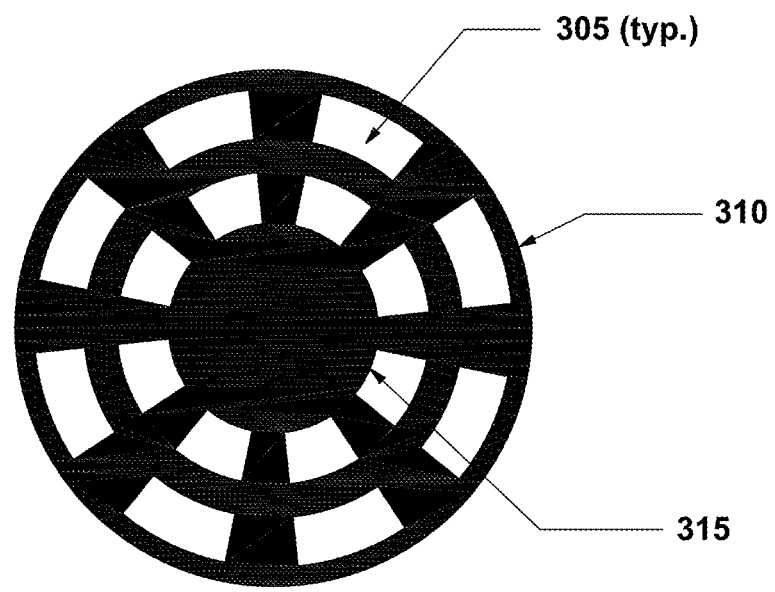

In FIG. 1, the top of the spent catalyst line is shown in a dashed circle (20). Further details are shown in FIGS. 2, 3 and 4 herein. The spent catalyst flows out of the of the spent catalyst line (5) and into a fluidized bed of catalyst in the regenerator. This fluidized catalyst bed can also be referred to as the "dense phase" (25) of the regenerator (1). In the regenerator, an oxygen-containing gas (referred to herein as "combustion air"), usually comprised of air, is injected into the regenerator vessel (1) through the regenerator air supply line (30). The combustion air is distributed throughout the bottom of the regenerator typically by means of an air grid (35), but other air distribution devices may be used either in conjunction with, or in lieu of, the air grid. In the dense phase portion of the reactor (25), the spent catalyst contacts the air at elevated temperatures sufficient to combust most of the hydrocarbons and coke from the spent catalyst. This combustion reaction generates heat which raises the catalyst temperature in the dense phase portion of the reactor. These combustion gases or combustion products rise through the fluidized catalyst bed (25), through the top of the catalyst bed (40) and into the "dilute phase" region (45) of the regenerator (1). It should be noted that the dense phase of the regenerator (25), the dilute phase of the regenerator (45), and the top of the catalyst bed (40) are not all distinct points in the regenerator, but are likened to a density gradient with a sharper distinction at the top of the catalyst bed (40) which is typically located near the top of the standpipe of the regenerated catalyst line (10).

The combustion gases in the dilute phase (45) then typically goes through further mechanical separation devices to remove small amounts of catalysts and other solids entrained in the combustion gases. In FIG. 1, these mechanical separation devices are shown as a two-stage cyclone arrangement (50) which separates the solids which pass through the bottom legs of the cyclones (50) back to the fluidized catalyst bed (25). The separated combustion gases then flow into an area inside the plenum (55) of the regenerator and then flow out of the overhead line (60) for further processing.

It should be noted that it is important to controlling the regeneration process that the combustion reactions in the regenerator take place in the dense phase (25) portion of the fluidized bed. This is important as firstly, the heat of combustion is used to heat and raise the temperature of the regenerated catalyst returning to the fluid catalytic cracking reactor. This heat of the catalyst is used to provide the necessary heat for catalytic reaction as well as minimize or eliminate additional heat that must be added to the FCC reaction zone to maintain proper reaction temperatures. Additionally, it is important that the combustion reactions in the regenerator take place in the dense phase (25) portion of the fluidized bed, since if combustion takes place in the dilute phase of the regenerator (45), the heat of combustion is not absorbed by the large mass of catalyst in the dense phase catalyst bed (25), but instead raises the top temperatures of the regenerator components in the area of the cyclones (50) and the plenum (55). The term "dilute phase" as utilized herein is intended to indicate a catalyst/gas mixture having a density of less than 300 kg/m$^3$. In a similar manner, the term "dense phase" is intended to mean that the catalyst/gas mixture has a density equal to or more than 300 kg/m$^3$. Representative dilute phase operating conditions can include a catalyst/gas mixture having a density of about 15 to about 150 kg/m$^3$.

It should also be noted that the plenum (55) and the cyclones (50) which are attached to the plenum generally hang from the top of the reactor vessel (1) to allow for the high amount of thermal expansion experienced in the regenerator. These regenerator designs are temperature limited as high temperatures cause the materials used in the plenum and cyclone construction to lose mechanical strength. Failure of these support areas can have catastrophic consequences. As such, these regenerator overhead or "cyclone" temperatures must be limited. If there is excessive combustion in the dilute phase area (45) the throughput of the regenerator unit is generally reduced to maintain proper temperatures. As such, reduction and control of combustion, i.e. afterburn, in the dilute phase is critical to efficient, safe, and reliable operation of the FCC regenerator.

FIG. 2 shows a spent catalyst distributor of the prior art. This design is basically a flat metal circle or disc (205) that is attached to the discharge end of the spent catalyst line (5) by spacers (210) creating radial openings (215) in the area between the disc (205) and the top end of the spent catalyst line (5). This disc (205) acts as a baffle plate to change the axial flow of the spent catalyst and entrained gases at least in part to a radial flow into the dense phase fluidized bed (see element 25, FIG. 1) inside the regenerator vessel (see element 1, FIG. 1).

In contrast, an embodiment of the present invention is a new design for distributing the spent catalyst and entrained gases with improved contact between the spent catalyst and entrained gases and more uniform distribution and combustion of the catalyst/gas mixtures in the dense phase fluidized bed (see element 25, FIG. 1). A preferred embodiment of the spent catalyst distributor of the present invention is illustrated in FIG. 3.

A preferred embodiment of the spent catalyst distributor of invention is shown both elevation and plan view in FIG. 3. In the plan view, the distributor is shown as circular with wedge-shaped (or "truncated" wedge-shaped) distribution tube (305) openings. However, the distributor may have any feasible plan shape and the distribution tubes (305) can be made with any cross-section shape, including, but not limited to wedge, circular, elliptical square, or triangular, or any "truncated" version of these geometries. By the term "truncated" as used as a prefix herein, it is meant any shape to which the term refers to that has been partially altered. For example, a semi-circular shape could be considered as a truncated circle.

As shown, the wedge shaped distribution tubes help maximize symmetry and distribution in the space provided, but circular (or other shaped) distribution tubes can also be used to assist in flow patterns inside of the chamber of the spent catalyst distributor. Continuing with the plan view in FIG. 3, the spent catalyst distributor preferably has a singular, continuous outer side (310). As used in the application herein, the term "side" as it refers to the side of the distributor herein, unless otherwise noted herein, is meant to cover both wherein the distributor side is a continuous "side" (such as when the distributor perimeter is in a circular or elliptical design) and wherein the distributor side is comprised of continuous "sides" (such as when the distributor perimeter is in a square, triangular, truncated-circular or truncated-elliptical design). It is preferred that the bottom of the spent catalyst distributor be substantially open at the bottom allowing for free flow downward inside the distributor of catalysts and gases. A substantial amount of the gases are then able to enter the bottoms of the distributor tubes (305) and pass through the tubes to the area above the top of the distributor. The areas shown in black in the plan view of FIG. 3 are typically plates (or can be made of a single plate) to that act to cap off the flow of the spent catalyst and entrained gases through the top of the spent catalyst distributor. Preferably, the center plate (315) is larger than the diameter of the spent catalyst riser (5).

The elevation view of FIG. 3 shows a cut-away schematic of the elevation of this embodiment. As can be seen, the distributor fits over the spent catalyst line (5). The top of the spent catalyst line (or "riser") can be oriented at any elevation between the top of the catalyst distributor and the bottom of the catalyst distributor as long as there is provided an area for the catalyst and entrained gases to escape from the spent catalyst line into the shrouded volume of the spent catalyst distributor. However, it is most preferable that the top of the spent catalyst line be oriented at an elevation between about 5 to about 25% of the total distributor height relative to (i.e., above) the bottom of the distributor. This elevation helps to maximize separation of the catalyst and entrained gases as well as improve radial distribution and minimize underpassing of the separate entrained gases from under the hood of the catalyst distributor.

The elevation view of FIG. 3 also shows a cut-away of the distribution tubes (305). As shown, the tops of distribution tubes (305) are shown flush with the top of the distributor hood. However, the tops of some or all of the distribution tubes can be positioned either be flush with, or above the top of the catalyst distributor. These distribution tubes fluidly connect the top of the catalyst distributor to an area below the top of the distributor. As shown in the embodiment of FIG. 3, the bottoms of distribution tubes (305) are shown flush with the bottom of the distributor hood. However, the bottoms of some or all of the distribution tubes can be positioned either be flush with, above the bottom, or below the bottom of the catalyst distributor. However, most preferably, the bottoms of some or all of the distribution tubes are positioned either flush with or above the bottom of the catalyst distributor Preferably, the distributor tubes have continuous solid (i.e., "non-porous") walls, although in some embodiments, the tubes may have perforations such as holes or slots, in the walls of the distribution tubes. Additionally, some of the top plates may have small perforations such as holes or slots, mainly to prevent small amount of hydrocarbon vapors from being trapped under the hood during evacuation or steaming of the vessel prior to entry for maintenance/inspection or for startup. However, these small holes should be small and somewhat inconsequential to the overall operation of the catalyst distributor during the normal operation of the device, such total square area of these small openings being on the order of about less 5%, more commonly less than about 2%, of the total square area of the opening of the distributor tubes (305).

Figure 4A:
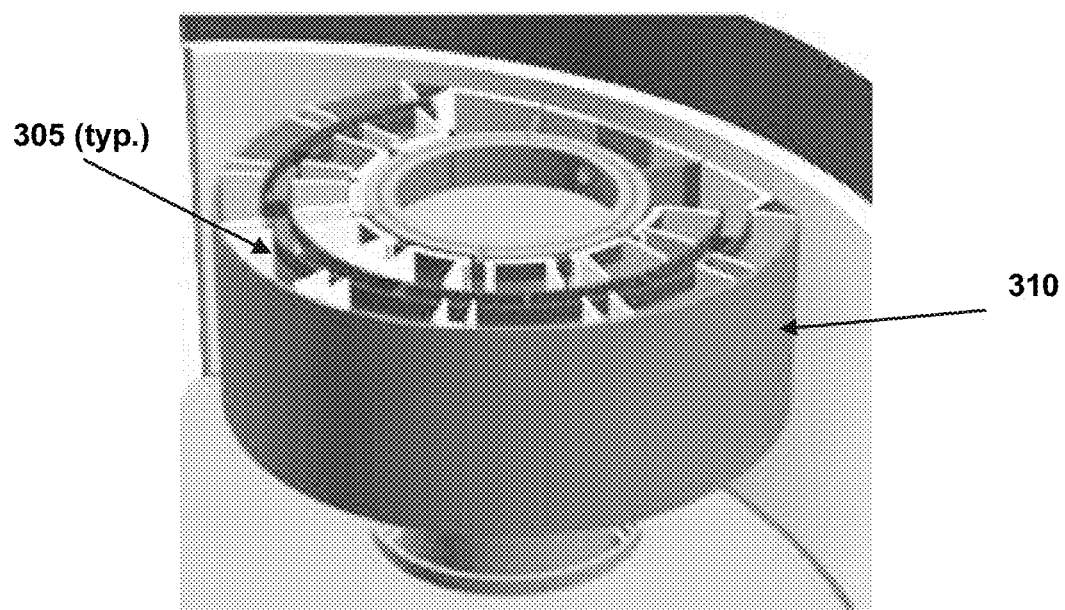
FIGS. 4A & 4B illustrate an embodiment of a spent catalyst distributor of the present invention (isometric views).
Figure 4B:
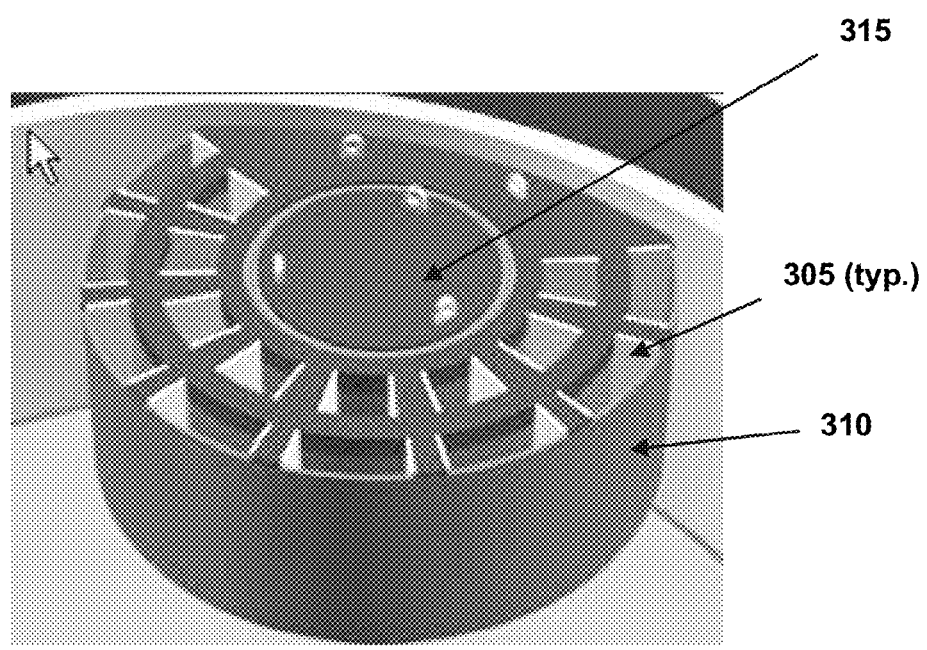

FIGS. 4A and 4B show isometric views of another preferred embodiment of the present invention. Here, the overall spent catalyst distributor is truncated to allow to design to accommodate a spent catalyst riser in close vicinity with the regenerator vessel wall while still designing the spent catalyst distributor with sufficient area to allow for proper flow and separation of the spent catalyst and entrained gases. FIG. 4A shows the spent catalyst distributor without the final top plates installed, while FIG. 4A shows the spent catalyst distributor with the final top plates (315) in place. Both FIGS. 4A and 4B illustrate the distribution tubes (305) and the distributor side(s) (310).

FIG. 4A shows a device wherein there are sixteen distribution tubes in the design. It is best that the design have a balance between the number of distribution tubes, the total square area of the distribution tubes and the "free" volume (i.e., volume not occupied by the distribution tubes) under the shroud of the catalyst distributor to provide of proper mixing and disengagement. In preferred embodiments of the present invention, the distributor contains from about 6 to about 50 distributor tubes, more preferably, from about 6 to about 30 distributor tubes. As can be noted in FIGS. 3, 4A, and 4B, in preferred embodiments, the distributor contains "rows" of distributor tubes wherein each row is spaced in a radial distance from the center of the distributor, the "center of the distributor" being considered the point of the distributor above the axis of the spent catalyst riser. In preferred embodiments, the distributor contains from about 1 to about 5 concentric rows, more preferably from about 2 to about 4, concentric rows of distribution tubes. The distribution tubes need not all be the same cross-sectional area or the same geometry. In preferred embodiments of the distributor, there are from about 2 to about 20, or more preferably, from about 2 to about 10 different cross-sectional areas of distributor tubes used in a particular distributor.

An important aspect of the design of the distributor is to provide for proper velocities in the distribution tubes and these velocities are related to the total cross-sectional flow area in the distribution tubes. It is also important that proper area under the top of the distributor that is not encumbered by the distribution tubes be sufficient to allow the flow of the of the catalyst and entrained gases under the distributor to substantially evenly access all of the distribution tubes to provide for as much as a uniform flow through the distributor tubes as possible. In a preferred embodiment of the present invention, the total cross sectional area of the distributor tubes is from about 10% to about 50%, or more preferably, from about 15% to about 30% of the total planar area of the top of the distributor. The "total planar area" of the top of the distributor is defined herein as defined by the plane that is perpendicular to the axis of the spent catalyst riser which produces the maximum area of the distributor top. It should be noted here that the top of the distributor need not be flat, but can have the shape or contour of a dome, semi-spherical, semi-elliptical, conical, or other shape.

In other preferred embodiments, the "total planar area" of the top of the distributor is from about 3 times to about 20 times, or more preferably, from about 5 times to about 15 times, the cross-sectional area of the spent catalyst riser. In controlling proper velocities through the distribution tubes, in preferred embodiments of the present invention, the total cross sectional area of the distributor tubes is from about 1 times to about 8 times, or more preferably, from about 1.5 times to about 5 times, the cross-sectional area of the spent catalyst riser. Preferably, the distribution tubes are sized such that the average velocity of the gases through the distribution tubes is from about 10% to about 100%, or more preferably, from about 20% to about 75% of the gas velocity in the spent catalyst riser.

The spent catalyst distributor may be attached to the spent catalyst riser by any means, such as spacers, bracing, etc., or attached in whole or in part to the regenerator air grid, vessel wall or internals, as long as the distributor is oriented substantially over spent catalyst riser, and the movement and thermal expansion of the relative regenerator vessel components are taken into consideration.

The Examples herein clearly show the benefits of the distributor of the present invention over designs of the prior art.

In Example 1, tracer testing was performed on a commercial fluid catalytic cracking (FCC) regenerator with a prior art distributor design similar to as shown in FIG. 2, to measure gas (air/oxygen) and solids (catalyst) both within the dense-phase fluidized catalyst bed as well as any "breakthrough" above the catalyst bed into the dilute phase of the regenerator. Krypton (Kr) was used as a tracer to measure the gas flow dynamics and Sodium (Na) was used to measure the solids flow dynamics in the regenerator.

Figures 5C, 5D:
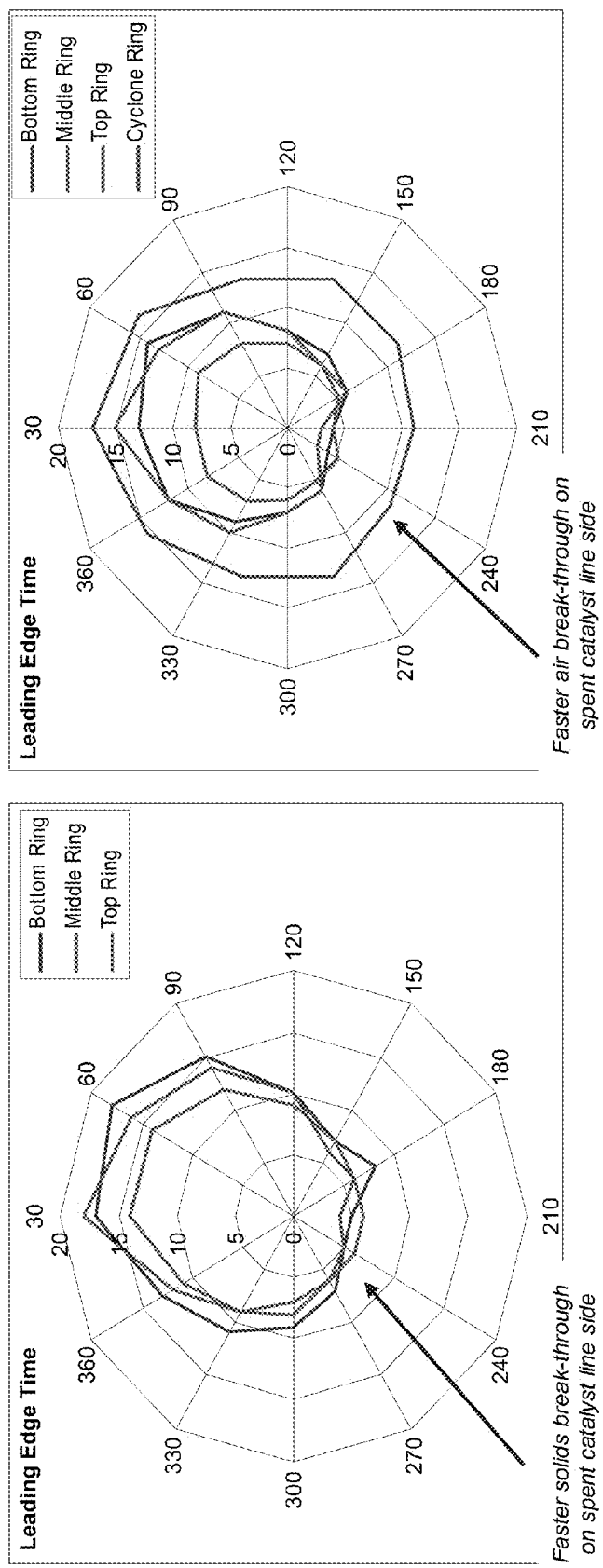
FIG. 5C is a "spider" graph showing the time for the leading edge of the solids breakthrough in the regenerator from the solids tracer testing in Example 1. (This Figure is in color).
FIG. 5D is a "spider" graph showing the time for the leading edge of the air (oxygen) breakthrough in the regenerator from the air tracer testing in Example 1. (This Figure is in color).

The spider graph of the "Solids Tracer Breakthrough Time" from the testing is shown in FIG. 5C. These results show that the solids breakthrough occurs faster near the spent catalyst line in the regenerator which is indicated by the shorter breakthrough time measured in the approximately 150° to 300° section of the reactor (i.e., the spent catalyst line at approximately 230° in the regenerator). FIG. 5D is a "spider" graph of the "Air Tracer Breakthrough Time" which shows the time for the leading edge of the air breakthrough in the regenerator. This graph shows that the air breakthrough also occurs faster near the spent catalyst line in the regenerator which is indicated by the shorter breakthrough time measured in the approximately 150° to 300° section of the reactor (i.e., the spent catalyst line at approximately 230° in the regenerator).

It should be noted that the air breakthrough is not simply limited to areas in and just above the catalyst bed (as shown by the "Bottom Ring", "Middle Ring", and "Top Ring" data in FIG. 5D), but this breakthrough continues up into the top of the reactor causing afterburn in the area of the cyclones (as shown by the "Cyclone Ring" data in FIG. 5D). From this testing, it was determined that greater than 10% of the total air was passing through about 1% of the bed cross-section indicating channeling in the prior art designs. This indicated that even in deep partial burn units, that about 1 to 2% of the total air was bypassing the bed (i.e., channeling).

This tracer test data performed on a commercial unit demonstrates that the designs of the prior art do not provide for proper distribution and mixing of the air and catalysts in the regenerator bed for complete combustion. More details are provided in the Example section below.

In Example 2 herein, a scaled-down, cold-flow regenerator was made to test the design of the present invention similar as to the embodiment shown in FIGS. 4A and 4B (truncated, near wall design). A 15 foot (15') tall, 48 inch (48") diameter vessel was fabricated for cold flow testing. Cold-flow simulations were performed under similar conditions for a regenerator design using the catalyst distribution "hat" as well as for an embodiment of the catalyst distributor of present invention. These tests were run for two cases for $U_{g,\,bed}$ which is the superficial air velocity in ft/sec through the catalyst bed in the cold-flow regenerator, $U_{g,\,riser}$ which is the air velocity in ft/sec through the spent catalyst riser in the cold-flow regenerator, and $G_{s,\,riser}$ which is the solids rate in lb/ft$^2$*sec through the spent catalyst riser in the cold-flow regenerator.

Figure 6:
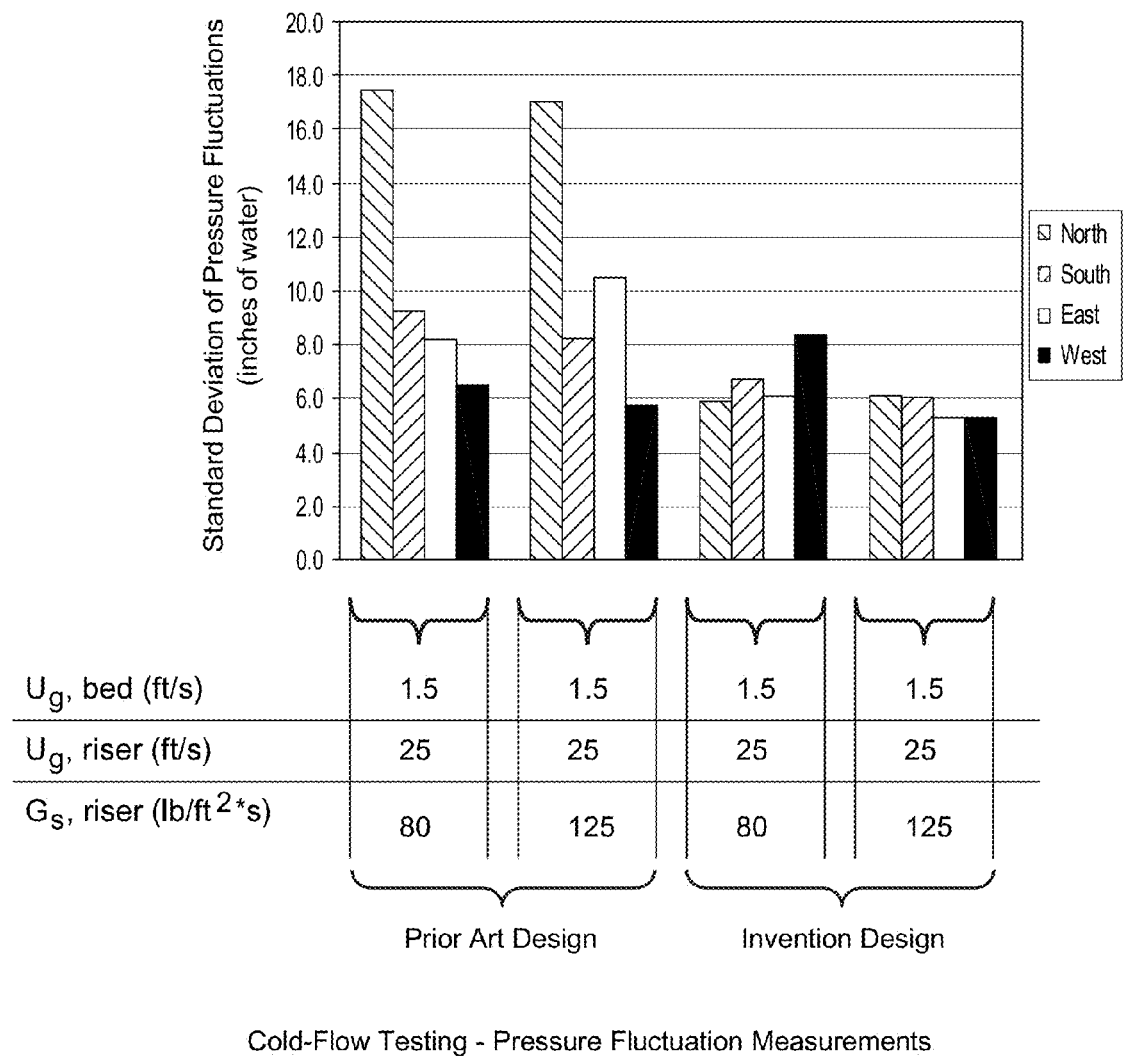
FIG. 6 is a graph of the pressure fluctuation measurements from cold-flow testing of Example 2.

Pressure sensors were mounted in the north, south, east and west quadrants of the cold flow vessel and the results of the testing are shown in FIG. 6. As can be seen in FIG. 6, the highest fluctuation peaks (particularly the north pressure sensor near the spent catalyst riser) are significantly lower in the embodiment of the present design. This shows that the present design provides for a more steady-state and even flow pattern in the fluidized catalyst bed than that experienced in the prior art. Additionally, it can be seen that the differences in the pressure fluctuations between each of the quadrants (north, south, east and west) are significantly smaller in the present invention than in the prior art. This indicates more uniform flow and contacting of the gas (air) and solids (catalyst) through the fluidized catalyst bed, indicating more uniform combustion in the fluidized catalyst bed and a reduction of air channeling through the bed, resulting in reduced afterburn.

Figure 7A:
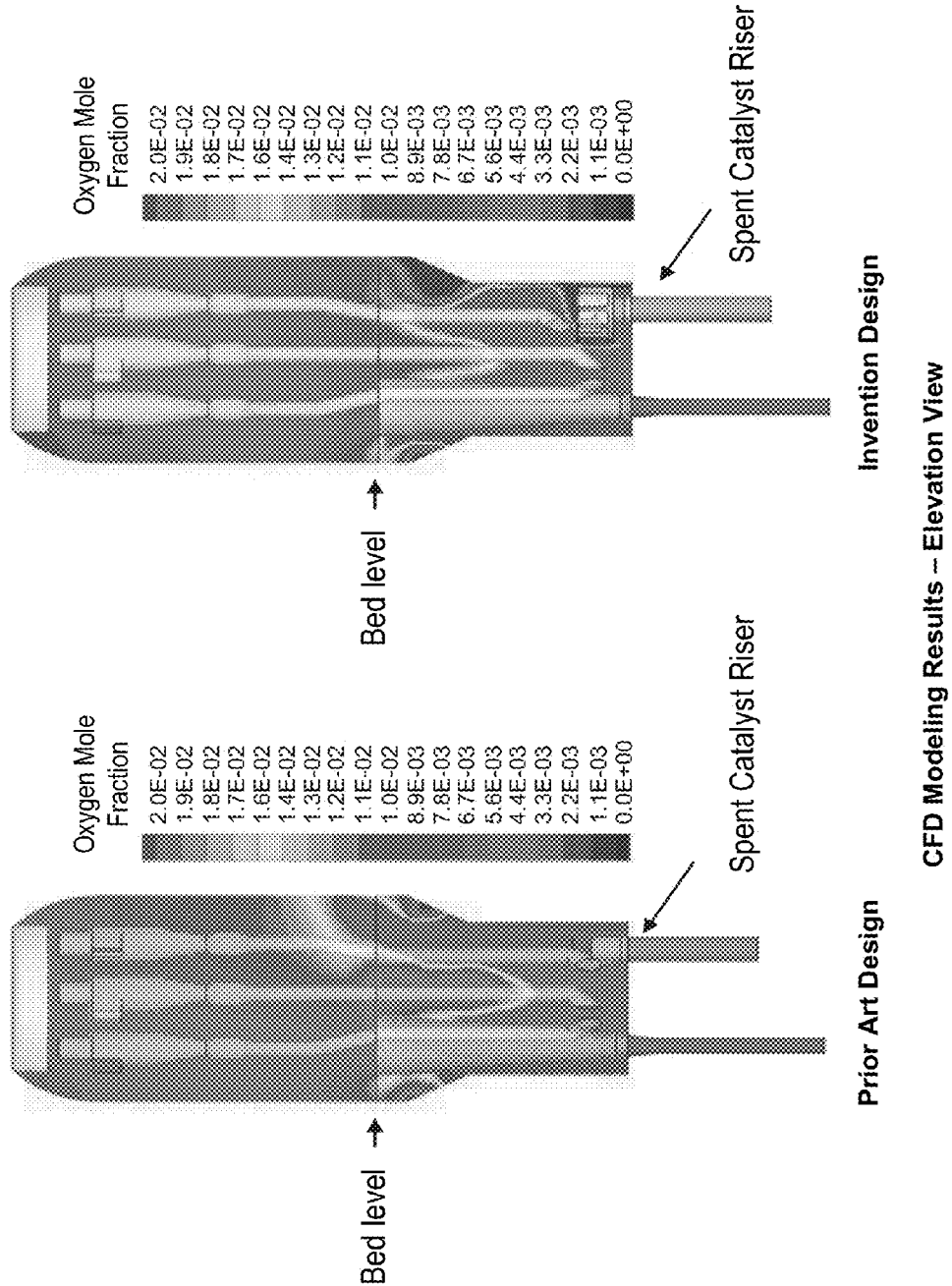
FIGS. 7A & 7B are computer model outputs of the results from Computational Flow Dynamics (CFD) modeling and testing of both the prior art and present invention designs for the spent catalyst distributors. (These Figures are in color).
Figure 7B:
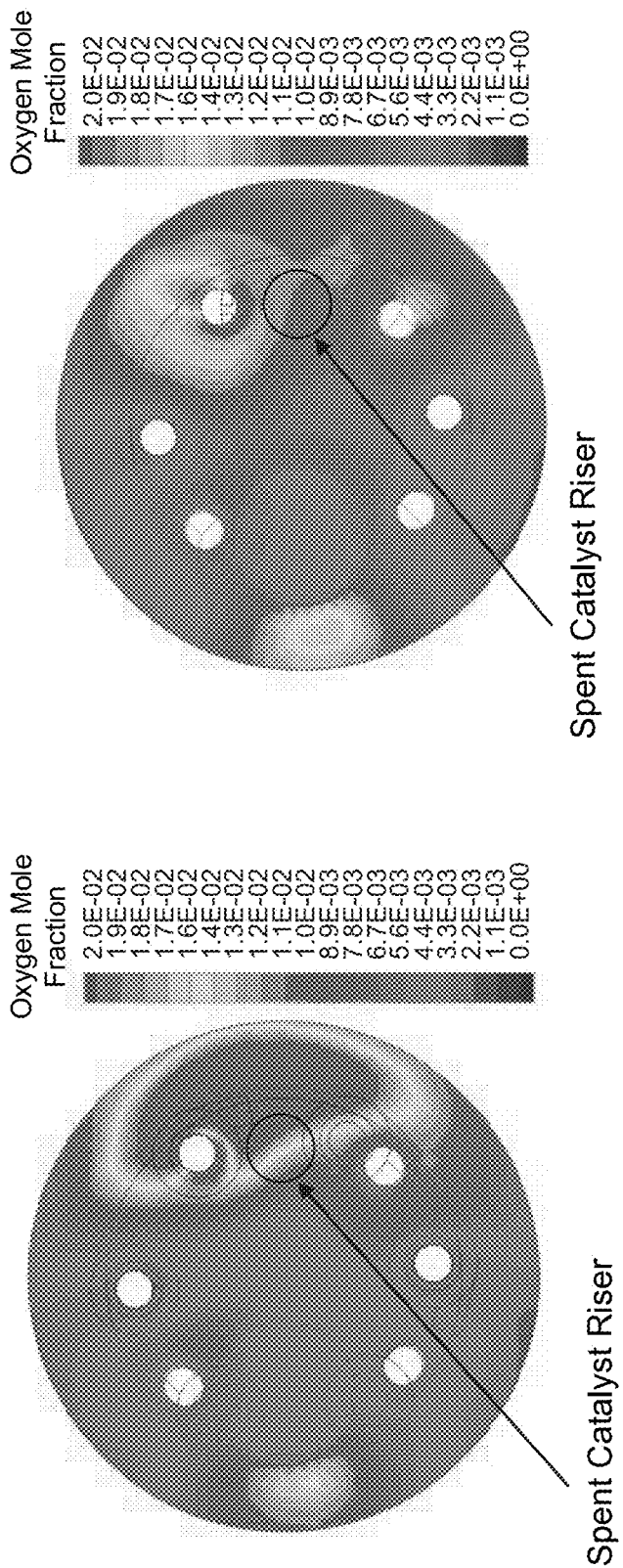

In Example 3, Computational Fluid Dynamics ("CFD") models were made to evaluate and compare performance of the spent catalyst riser distributor design of prior art versus the design of present invention, the results of these models are shown in FIGS. 7A and 7B. FIG. 7A shows the oxygen distribution in oxygen mole fraction for each the "Prior Art Design" and the design embodying the present invention ("Invention Design"). As can be in this figure, in the prior art design on the left-hand side of the figure, a high mole fraction stream (shown in reds and yellows) of oxygen breaks through the fluidized catalyst bed level into the dilute phase of the regenerator. This oxygen breakthrough is a known cause of afterburn in the dilute phase of the regenerator. In contrast, in the design of the present invention shown on the right-hand side of FIG. 7A, the high mole fraction stream (shown in reds and yellows) of oxygen. Here, a much greater percentage of the total oxygen is contained in the catalyst bed where it is be combusted and the heat of combustion is transferred to the catalyst. This design of the present invention results in a significant reduction in afterburn.

FIG. 7B shows the results from the same CFD models, but from the perspective of a plan view of the regenerator at the level of the top of the fluidized catalyst bed. Again, here it can be seen that the high mole fraction stream (shown in reds and yellows) of oxygen breakthrough is significantly reduced in the design of the present invention. Additionally, it can be seen in FIG. 7B that the distribution of oxygen is significantly more uniform in the design of the present invention (as indicated by the more uniform temperature profile in the right-hand side of FIG. 7B) than in the prior art design (indicated by the temperature profile in the left-hand side of FIG. 7B).

It was determined from these models that the spent catalyst distributor design of the present invention resulted in a greater than a 30% reduction in oxygen breakthrough as compared to the prior art design. This reduction in oxygen breakthrough with the design of the present invention results in a significant reduction in afterburn in the FCC regenerator vessel.

In Example 4, an embodiment of the spent catalyst distributor of the present invention was installed in a commercial fluid catalytic cracking regenerator for proof of concept of the design.

Figure 8:
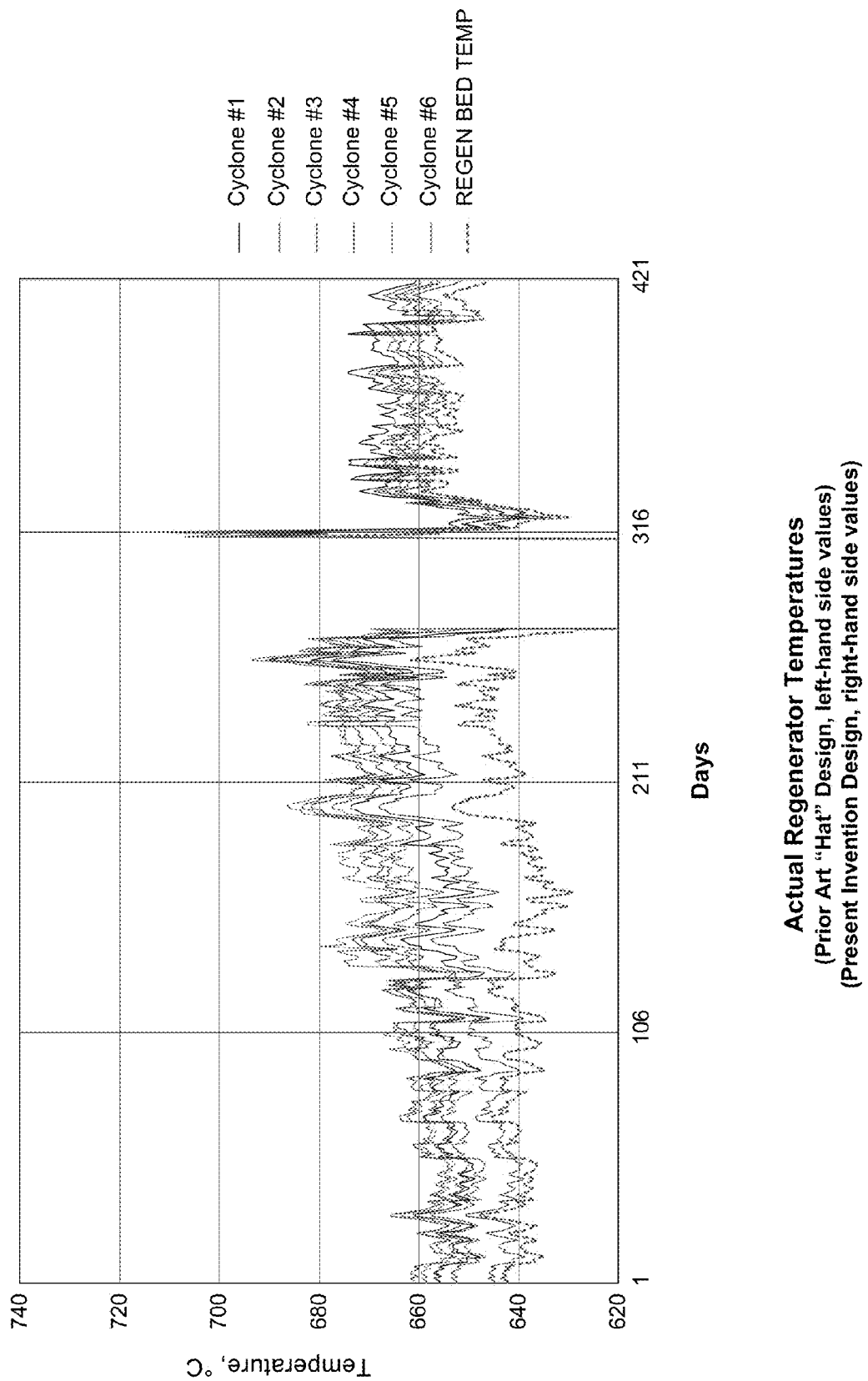
FIG. 8 is the actual temperature profiles from a commercial FCC regenerator showing the prior art "hat" catalyst distributor design (left-hand side data) and the temperature profiles after a prototype of the present invention catalyst distributor design (right-hand side data) was installed in the FCC regenerator. (This Figure is in color).

Regeneration Bed (i.e., fluidized catalyst bed) temperatures as well as Regenerator Cyclone (i.e., top of regenerator) temperatures were monitored both with the prior art "hat" design as well as after the new design of the present invention which was installed. FIG. 8 shows a plot of daily averages for the regeneration bed temperatures and the temperatures of the six cyclones in the top of the regenerator for approximately 421 days. The temperatures associated with the distributor "hat" design of the prior art are shown from Day 1 to about Day 275. The regenerator was then shutdown for a period of about 35 days (from about Day 275 to Day 310 in FIG. 8) during which the spent catalyst distributor design of the present invention was installed. During this shutdown period, the graph in FIG. 8 shows no temperature readings.

After shutdown and lining out the unit with the new design (around Day 335 to Day 421, in FIG. 8), the temperature effects on the Regenerator Bed and Regenerator Cyclone due to the new design can be seen. As the data shows in FIG. 8, there is a wide disparity between the cyclone temperatures and the catalyst bed (or as labeled in FIG. 8 as "regen bed") temperature with the prior art design (Day 1 to Day 275). What is desired is that all of these temperatures be as close as possible. This is especially true between the catalyst bed temperature and the cyclone temperatures. The elevated cyclone temperatures (relative to the catalyst bed temperatures) are a measure of the amount of afterburn which is raising the temperature of the gases in the top of the regenerator above the temperature of the catalyst bed. If there were no afterburn, the cyclone temperatures should be about equal to the catalyst bed temperature.

The improved results achieved by the present invention are shown in the data on the right-hand side of FIG. 8 (Day 335 to Day 421). As can be seen in the data associated with the new design, the cyclone temperatures were lowered and the regeneration bed temperature was raised. This resulted in a significantly lower difference in the pressure profiles between the cyclone temperatures and the catalyst bed temperature. This data clearly shows that afterburn was reduced (as evidenced by both lower cyclone temperatures as well as a lower difference between the cyclone and catalyst bed temperatures) and that more of the combustion, and thus the heat generated, was occurring in the catalyst bed and used to heat the catalyst (as evidenced by both higher catalyst bed temperatures as well as a lower difference between the cyclone and catalyst bed temperatures).

Example 4 clearly illustrates that the present invention improves combustion in the fluidized catalyst bed, reduces oxygen breakthrough, and reduces afterburn in an FCC regenerator of a commercial sized fluidized catalytic cracking (FCC) unit. More details on the testing and analysis can be found in Example 4, below.

As part of the present invention, the regenerator design, including the spent catalyst distributor of the present invention, can be utilized in conjunction with a fluidized catalytic cracking reactor vessel and associated equipment in a process for fluid catalytically hydrocarbons. These processes include both catalytic cracking of petroleum feeds primarily for the production of fuels such as gasolines, or can be catalytic cracking of petrochemical feedstocks primarily for the production of chemicals, such as olefins or polymer feedstock production.

Preferably, the apparatus of invention is used in the catalytic cracking of a hydrocarbon feedstock into lower molecular weight products. In this process, the hydrocarbon feed is preferably conducted to a short contact-time FCC reactor or reaction zone. Here, the hydrocarbon feed is injected through one or more feed nozzles into the reaction zone, which is preferably a short contact-time reaction riser design. Within this reactor zone, the hydrocarbon feed is contacted with a catalytic cracking catalyst under cracking conditions thereby resulting in spent catalyst particles containing carbon (or "coke") as well as hydrocarbon residue deposited thereon and producing a lower boiling product stream. The cracking conditions are conventional and will typically include: temperatures from about 932° F. to about 1040° F. (500° C. to 560° C.), preferably about 977° F. to about 1004° F. (525 to 540° C.); hydrocarbon partial pressures from about 10 to 50 psia (70-345 kPa), preferably from about 20 to 40 psia (140-275 kPa); and a catalyst to feed (wt/wt) ratio from about 3 to 8, preferably about 5 to 6, where the catalyst weight is total weight of the catalyst composite. Steam may be concurrently introduced with the feed into the reaction zone. The steam may comprise up to about 5 wt % of the feed. Preferably, the FCC feed residence time in the reaction zone is less than about 5 seconds, more preferably from about 3 to 5 seconds, and even more preferably from about 2 to 3 seconds.

Catalysts suitable for use herein in the FCC processes herein are cracking catalysts comprising either a large-pore molecular sieve or a mixture of at least one large-pore molecular sieve catalyst and at least one medium-pore molecular sieve catalyst. Large-pore molecular sieves suitable for use herein can be any molecular sieve catalyst having an average pore diameter greater than 0.7 nm which are typically used to catalytically "crack" hydrocarbon feeds. It is preferred that both the large-pore molecular sieves and the medium-pore molecular sieves used herein be selected from those molecular sieves having a crystalline tetrahedral framework oxide component. Preferably, the crystalline tetrahedral framework oxide component is selected from the group consisting of zeolites, tectosilicates, tetrahedral aluminophosphates (ALPOs) and tetrahedral silicoaluminophosphates (SAPOs). More preferably, the crystalline framework oxide component of both the large-pore and medium-pore catalyst is a zeolite. It should be noted that when the cracking catalyst comprises a mixture of at least one large-pore molecular sieve catalyst and at least one medium-pore molecular sieve, the large-pore component is typically used to catalyze the breakdown of primary products from the catalytic cracking reaction into clean products such as naphtha for fuels and olefins for chemical feedstocks.

Large pore molecular sieves that are typically used in commercial FCC process units are also suitable for use herein. FCC units used commercially generally employ conventional cracking catalysts which include large-pore zeolites such as USY or REY. Additional large pore molecular sieves that can be employed in accordance with the present invention include both natural and synthetic large pore zeolites. Non-limiting examples of natural large-pore zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, and ferrierite. Non-limiting examples of synthetic large pore zeolites are zeolites X, Y, A, L. ZK-4, ZK-5, B, E, F, H, J, M, Q, T, W, Z, alpha and beta, omega, REY and USY zeolites. It is preferred that the large pore molecular sieves used herein be selected from large pore zeolites. The more preferred large-pore zeolites for use herein are the faujasites, particularly zeolite Y, USY, and REY.

Medium-pore size molecular sieves that are suitable for use herein include both medium pore zeolites and silicoaluminophosphates (SAPOs). Medium pore zeolites suitable for use in the practice of the present invention are described in "Atlas of Zeolite Structure Types", eds. W. H. Meier and D. H. Olson, Butterworth-Heineman, Third Edition, 1992, which is hereby incorporated by reference. The medium-pore size zeolites generally have an average pore diameter less than about 0.7 nm, typically from about 0.5 to about 0.7 nm and includes for example, MFI, MFS, MEL, MTW, EUO, MTT, HEU, FER, and TON structure type zeolites (IUPAC Commission of Zeolite Nomenclature). Non-limiting examples of such medium-pore size zeolites, include ZSM-5, ZSM-12, ZSM-22, ZSM-23, ZSM-34, ZSM-35, ZSM-38, ZSM-48, ZSM-50, silicalite, and silicalite 2. The most preferred medium pore zeolite used in the present invention is ZSM-5, which is described in U.S. Pat. Nos. 3,702,886 and 3,770,614. ZSM-11 is described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. As mentioned above SAPOs, such as SAPO-11, SAPO-34, SAPO-41, and SAPO-42, which are described in U.S. Pat. No. 4,440,871 can also be used herein. Non-limiting examples of other medium pore molecular sieves that can be used herein are chromosilicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651; and iron aluminosilicates. All of the above patents are incorporated herein by reference.

The large-pore and medium-pore catalysts of the present invention will typically be present in an inorganic oxide matrix component that binds the catalyst components together so that the catalyst product is hard enough to survive inter-particle and reactor wall collisions. The inorganic oxide matrix can be made from an inorganic oxide sol or gel which is dried to "glue" the catalyst components together. Preferably, the inorganic oxide matrix will be comprised of oxides of silicon and aluminum. It is also preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species is an aluminum trihydroxide such as gibbsite, bayerite, nordstrandite, or doyelite. The matrix material may also contain phosphorous or aluminum phosphate. It is within the scope of this invention that the large-pore catalysts and medium-pore catalysts be present in the same or different catalyst particles, in the aforesaid inorganic oxide matrix.

As mentioned above, the contacting of the hydrocarbon feed with the cracking catalyst results in spent catalyst particles containing carbon (coke) and hydrocarbon residue deposited thereon and a product stream that has a lower average boiling point than the hydrocarbon feed. The majority of, and preferably substantially all of, the spent catalyst particles are conducted to a stripping zone in the FCC reactor. The stripping zone will typically contain a dense bed of catalyst particles where stripping of volatiles takes place by use of a stripping agent such as steam. There will also be space above the stripping zone wherein the catalyst density is substantially lower and which space can be referred to as a "dilute phase" of the FCC reactor.

The majority of, and preferably substantially all of, the stripped catalyst particles are subsequently conducted to a regeneration zone wherein they will contact the catalyst stripper device of the present invention as detailed above, where the spent catalyst and entrained gases are efficiently separated and distributed into the dense-phase fluidized catalyst bed. Here, in the regenerator, preferably substantially in the catalyst bed of the regenerator, the spent catalyst particles are regenerated by burning coke and any remaining residual hydrocarbons from the spent catalyst particles in the presence of an oxygen-containing gas, preferably air thus producing regenerated catalyst particles. This regeneration step restores catalyst activity and simultaneously heats the catalyst to a temperature from about 1076° F. (580° C.) to about 1382° F. (750° C.). The regenerator is operated in either under partial-burn or full-burn conditions. In a preferred embodiment of the present invention, the regenerator is operated under partial-burn conditions. The majority of, and preferably substantially all of, the hot regenerated catalyst particles are then recycled to the FCC reaction zone where they contact the injected hydrocarbon feed.

Although the preferred use of the spent catalyst distributor as described above is for use in a fluid catalytic cracking ("FCC") regenerator, the spent catalyst distributor as described in all of its embodiments above can also be used in conjunction with the spent catalyst line associated with a fluid coking regenerator. In a fluid coking process, the fluid coking regenerator takes in spent catalyst from a spent catalyst line (including an spent catalyst riser internal to the fluid coking regenerator) utilizing a lift gas, similar to the FCC processes, into a dense bed area of the fluid coking regenerator for combustion. The fluid coking regenerator similarly uses air (or other combustible gases such as oxygen) to burn most of the coke and un-combusted hydrocarbons from the fluid coking catalyst in the dense bed of the regenerator.

Since the fluid coking regeneration equipment and processes are very similar to those described above for the FCC regenerators, the same problems of undesired high temperatures in the top of the fluid coking regenerators do exist due to incomplete combustion of the coke and hydrocarbons in the fluidized dense catalyst bed of the regenerator. Additionally, other problems exist in the fluid coking regenerators due to the incomplete or uneven mixing and burning of the coke from the catalyst particles such as loss of catalyst temperature used for the fluid coking reaction, as well as the excessive generation of small coke particles which get into the overhead flue gas of the fluid coking regenerator causing equipment plugging as well as environmental concerns.

In an embodiment of the present invention, the spent catalyst distributor as defined above for use with an FCC regenerator also apply herein for use with a fluid coking regenerator vessel. In short, the embodiments of spent catalyst distributor as described above can be used when such spent catalyst distributor is in fluid connection with the spent catalyst riser of a fluid coking regenerator.

A preferred embodiment of a process incorporating an embodiment of spent catalyst distributor of design is as follows. A fluid cracking process, comprising:

a) injecting a hydrocarbon feed through one or more feed nozzles connected to a fluid cracking reactor zone;

b) contacting the hydrocarbon feed with a hot fluidized catalyst in the fluid cracking reactor zone to produce a cracked hydrocarbon product and a reaction catalyst;

c) separating at least a portion of the cracked hydrocarbon product from the reaction catalyst; wherein the reaction catalyst contains hydrocarbon residue and coke products;

d) stripping at least a portion of the reaction catalyst with a stripping fluid to remove at least a portion of the hydrocarbon residue from the reaction catalyst thereby producing a spent catalyst;

e) passing at least a portion of the spent catalyst with a lift gas through a spent catalyst line to a spent catalyst riser;

f) contacting the spent catalyst and lift gas exiting the spent catalyst riser with a distributor; and g) separating at least a portion of the spent catalyst from the lift gas through the distributor;

wherein the distributor is fluidly attached to the discharge end of a spent catalyst riser, and the distributor is located in the dense phase catalyst bed of a fluid cracking regenerator vessel, and the distributor is comprised of:

a top;

a continuous distributor side which is attached to the top of the distributor and extends downwardly from the top of the distributor so as to form a sealed volume between the top of the distributor and the side of the distributor; and a plurality of distributor tubes which fluidly connect the area at or above the top of the distributor to the area below the top of the distributor.

In preferred embodiments of the fluid coking process above, the fluid cracking process is selected from the group consisting of a fluid catalytic cracking process and a fluid coking process. In a most preferred embodiment of the present invention, the fluid cracking process is a fluid catalytic cracking process.

The following examples provide more details as to the experiments and testing performed, as well as the data obtained from the experimentation. These examples are presented for illustrative purposes only and are not to be taken as limiting the present invention in any manner.

EXAMPLES

Example 1

In this example, a commercial fluid catalytic cracking ("FCC") regenerator was tracer tested for solids and air breakthrough. The FCC unit was a Exxon Model IV reactor/regenerator unit with the spent catalyst line (5) and regenerated catalyst line (10) positioned on approximately opposite sides (i.e., approximately 180° apart) inside the regenerator vessel (1) as shown in the schematic of FIG. 5A illustrating the bottom portion of an FCC regenerator (1). Tracer detectors (505) were placed at approximately 30° intervals around the regenerator as shown in FIG. 5B. Four separate rings of the detectors were placed at elevations of approximately 41", 102", 272", and 631" above the tangent line of the vessel as shown in FIG. 5A. The top of the air grid (35) was approximately 20" above the tangent line of the regenerator. The lower two detector rings (at elevations 41" and 102") were at an elevation above the air grid and spent catalyst riser in the dense phase, fluidized catalyst bed of the regenerator. The third detector ring (at elevation 272") was at an elevation just above the top of the regenerated catalyst standpipe in the dilute phase of the regenerator above the top level of the fluidized catalyst bed. The fourth detector ring (at elevation 631") was at the elevation near the tops of the regenerator cyclones in the top of the regenerator.

Krypton (Kr) tracer elements were injected in the combustion air line and the spent catalyst line to monitor the amount of air/oxygen (gas) breakthrough in the regenerator. Sodium (Na) tracer elements were injected in the spent catalyst line to monitor the amount of catalyst (solids) breakthrough in the regenerator. The unit was operated under normal commercial conditions of about 53 tons catalyst/min of catalyst circulation. The FCC unit was operated in a partial burn mode.

FIG. 5C is a "spider" graph showing the time for the leading edge of the solids breakthrough in the regenerator. This graph shows that the solids breakthrough occurs faster near the spent catalyst line in the regenerator which is indicated by the shorter breakthrough time measured in the approximately 150° to 300° section of the reactor (i.e., the spent catalyst line at approximately 230° in the regenerator). FIG. 5D is a "spider" graph showing the time for the leading edge of the air breakthrough in the regenerator. This graph shows that the air breakthrough also occurs faster near the spent catalyst line in the regenerator which is indicated by the shorter breakthrough time measured in the approximately 150° to 300° section of the reactor (i.e., the spent catalyst line at approximately 230° in the regenerator).

It should be noted that the air breakthrough is not simply limited to areas in and just above the catalyst bed (as shown by the "Bottom Ring", "Middle Ring", and "Top Ring" data in FIG. 5D), but this breakthrough continues up into the top of the reactor causing afterburn in the area of the cyclones (as shown by the "Cyclone Ring" data in FIG. 5D). From this testing, it was determined that greater than 10% of the total air was passing through about 1% of the bed cross-section indicating channeling in the prior art designs. This indicated that even in deep partial burn units, that about 1 to 2% of the total air was bypassing the bed (i.e., channeling).

This example demonstrates that the designs of the prior art do not provide for proper distribution and mixing of the air and catalysts in the regenerator bed for complete combustion and that this directly leads to increased afterburn, as a result of air channeling, in these regenerator designs.

Example 2

In this example a scaled-down, cold-flow regenerator was made to test the design of the present invention similar as to the embodiment shown in FIGS. 4A and 4B (truncated, near wall design). A 15 foot (15') tall, 48 inch (48") diameter vessel was fabricated for cold flow testing. In one set of tests, a scaled-down spent catalyst distributor of an embodiment of the present invention similar to as shown in FIG. 4B, with circular distribution tubes, was mounted above an air grid and tested under cold flow conditions to simulate commercial operation. In a second set of tests catalyst distribution "hat" of the prior art as shown in FIG. 2 was used in place of the present design in the cold-flow regenerator and tested under the same sets of conditions.

Pressure sensors were mounted in the north, south, east and west quadrants of the cold flow vessel at approximately 48" above the air grid to measure the pressure fluctuations in the fluidized bed. The spent catalyst line was positioned between the north and east sensors in the planar view of the cold flow regenerator. The pressure measurements were taken under two separate test conditions for each of the prior art and present invention designs as shown in the following Table 1.

TABLE 1

Test Conditions for Cold Flow Regenerator

| Test # | Gas velocity through the air grid, $U_{g,\,bed}$ (ft/sec) | Gas velocity through spent catalyst riser, $U_{g,\,riser}$ (ft/sec) | Solids rate through spent catalyst riser, $G_{s,\,riser}$ (lb/ft²-sec) |
|---|---|---|---|
| 1 | 1.5 | 25 | 80 |
| 2 | 1.5 | 25 | 125 |

Here, $U_{g,\,bed}$ is the superficial air velocity in ft/sec through the catalyst bed in the cold-flow regenerator, $U_{g,\,riser}$ is the air velocity in ft/sec through the spent catalyst riser in the cold-flow regenerator, and $G_{s,\,riser}$ is the solids rate in lb/ft²*sec through the spent catalyst riser in the cold-flow regenerator.

The pressure fluctuations in each of the four quadrants (north, south, east and west) were measured and the standard deviations for the pressures in each of the four quadrants were calculated (in inches of water). The results of these tests are shown in FIG. 6.

As can be seen in FIG. 6, the highest fluctuation peaks (particularly the north pressure sensor) are significantly lower in the embodiment of the present design. This shows that the present design provides for a more steady-state and even flow pattern in the fluidized catalyst bed than that experienced in the prior art. Additionally, it can be seen that the differences in the pressure fluctuations between each of the quadrants (north, south, east and west) are significantly smaller in the present invention than in the prior art. This indicates more uniform flow and contacting of the gas (air) and solids (catalyst) through the fluidized catalyst bed, indicating more uniform combustion and a reduction of air channeling through the bed, resulting in reduced afterburn.

Example 3

In this example, Computational Fluid Dynamics ("CFD") models were made to evaluate and compare performance of the spent catalyst riser distributor design of prior art versus the design of present invention. A commercial regenerator was computer modeled for both designs and the CFD models were run at conditions simulating commercial operations. The models were based on a commercial design rate of 36,000 barrel per day FCC unit with a catalyst circulation rate through the regenerator of about 22 tons per minute. The models were based on partial burn conditions with an approximate carbon monoxide target of about 8 vol % in the flue gas from the regenerator. The results of the computational fluids dynamics analysis for both designs are shown graphically in FIGS. 7A and 7B.

FIG. 7A shows the oxygen distribution in oxygen mole fraction for each the "Prior Art Design" and the design embodying the present invention ("Invention Design"). As can be in this figure, in the prior art design on the left-hand side of the figure, a high mole fraction stream (shown in reds and yellows) of oxygen breaks through the fluidized catalyst bed level into the dilute phase of the regenerator. This oxygen breakthrough is a known cause of afterburn in the dilute phase of the regenerator. In contrast, in the design of the present invention shown on the right-hand side of FIG. 7A, the high mole fraction stream (shown in reds and yellows) of oxygen. Here, a much greater percentage of the total oxygen is contained in the catalyst bed where it can be combusted and the heat of combustion be transferred to the catalyst. This design of the present invention results in a significant reduction in afterburn.

FIG. 7B shows the results from the same CFD models, but from the perspective of a plan view of the regenerator at the level of the top of the fluidized catalyst bed. Again, here it can be seen that the high mole fraction stream (shown in reds and yellows) of oxygen breakthrough is significantly reduced in the design of the present invention. Additionally, it can be seen in FIG. 7B that the distribution of oxygen is significantly more uniform in the design of the present invention (as indicated by the more uniform temperature profile in the right-hand side of FIG. 7B) than in the prior art design (indicated by the temperature profile in the left-hand side of FIG. 7B).

It was determined from these models that the spent catalyst distributor design of the present invention resulted in a greater than a 30% reduction in oxygen breakthrough as compared to the prior art design. This reduction in oxygen breakthrough with the design of the present invention results in a significant reduction in afterburn in the FCC regenerator vessel.

Example 4

In this example, an embodiment of the spent catalyst distributor of the present invention was installed in a commercial fluid catalytic cracking regenerator for proof of concept of the design.

The FCC regenerator was part of a 36,000 barrel per day capacity FCC unit and a catalyst circulation rate through the regenerator of about 22 tons per minute. The regenerator was operated under partial burn conditions. The original FCC regenerator had a spent catalyst distributor "hat" design similar to as shown in FIG. 2. The "hat" was replaced with a preferred embodiment of the spent catalyst distributor of the present invention similar to as shown in FIG. 4B.

Regeneration Bed (i.e., fluidized catalyst bed) temperatures as well as Regenerator Cyclone (i.e., top of regenerator) temperatures were monitored both with the prior art "hat" design as well as after the new design of the present invention was installed. FIG. 8 shows a plot of daily averages for the regeneration bed temperatures and the temperatures of each of the six cyclones in the top of the regenerator for approximately 421 days. The temperatures associated with the distributor design of the prior art are shown from Day 1 to about Day 275. The regenerator was then shutdown for a period of about 35 days (from about Day 275 to Day 310 in FIG. 8) during which the spent catalyst distributor design of the present invention was installed. During this shutdown period, the graph in FIG. 8 shows no temperature readings. Please note that in the back & white version of FIG. 8, the regenerator bed temperature consistently shows as the bottom most line in the graph and is shown as a dashed line, while the six cyclone temperatures are shown as the six solid lines above the regenerator bed temperature.

After about Day 310 in FIG. 8, the FCC unit (including the regenerator with the new distributor design) began startup. The initial post-startup temperature spikes are due to startup operations. However, after lining out the unit with the new design (around Day 335 to Day 421, in FIG. 8), the temperature effects on the Regenerator Bed and Regenerator Cyclone due to the new design can be seen.

What can be seen in FIG. 8 is that there is a wide disparity between the cyclone temperatures and the catalyst bed (or "regen bed") temperature with the prior art design (Day 1 to Day 275). What is desired is that all of these temperatures be as close as possible. This is especially true between the catalyst bed temperature and the cyclone temperatures. The elevated cyclone temperatures (relative to the catalyst bed temperatures) are a measure of the amount of afterburn which is raising the temperature of the gases in the top of the regenerator above the temperature of the catalyst bed. If there were no afterburn, the cyclone temperatures should be about equal to the catalyst bed temperature.

What is amazing are the results achieved by the present invention as shown in the data on the right-hand side of FIG. 8 (Day 335 to Day 421). As can be seen in the data associated with the new design, the cyclone temperatures were lowered and the regeneration bed temperature was raised. This resulted in a significantly lower difference in the profiles between the cyclone temperatures and the catalyst bed temperature. This data clearly shows that afterburn was reduced (as evidenced by both lower cyclone temperatures as well as a lower difference between the cyclone and catalyst bed temperatures) and that more of the combustion, and thus the heat generated, was occurring in the catalyst bed and used to heat the catalyst (as evidenced by both higher catalyst bed temperatures as well as a lower difference between the cyclone and catalyst bed temperatures).

This can be seen by reviewing the actual operating data presented in FIG. 8, where it can be seen that after the new distributor design was installed (around Day 335), the individual temperature profiles are much closer to each other than prior to the installation of the new distributor design. In particular, and most important, the bottom line in red (showing the Regenerator Bed Temperature) is much closer to all (i.e., the average) of the cyclone temperatures. This is especially important as this is a positive indication of a reduction in afterburn associated with the present invention.

Taking points at approximately Day 211 (prior to the new distributor design installation), the Regenerator Catalyst Bed Temperature is about 645° C., while the average Cyclone Temperature is about 665° C.; an Average Cyclone Temperature to Regenerator Catalyst Bed Temperature difference of about 20° C.

Taking points at approximately Day 370, (after the new distributor design installation), the Regenerator Catalyst Bed Temperature is about 655° C., while the average Cyclone Temperature is about 660° C.; an Average Cyclone Temperature to Regenerator Catalyst Bed Temperature difference of about 5° C. This shows that the afterburn was significantly reduced by the new distributor design. Also, since the cyclone temperatures often are a limitation on the operating design of an FCC Regenerator, it can be seen with the design of invention, that the Regenerator Catalyst Bed Temperature after the new installation was able to run at about 15° C. higher (i.e., 660° C. vs 645° C.) than prior to the installation while maintaining the same or lower cyclone temperatures. In a preferred embodiment of the present invention, the Average Cyclone Temperature to Regenerator Catalyst Bed Temperature difference is less 15° C., preferably less than 10° C., and more preferably less than 5° C.

This example clearly illustrates that, the present invention improves combustion in the fluidized catalyst bed, reduces oxygen breakthrough, and reduces afterburn in an FCC regenerator of a commercial sized fluidized catalytic cracking (FCC) unit.

What is claimed is:

1. A fluid cracking regenerator vessel, comprising:
a distributor fluidly attached to the discharge end of a spent catalyst riser, wherein the discharge end of a spent catalyst riser is located internal to the fluid cracking regenerator vessel, and wherein the distributor is comprised of:
a) a top;
b) a continuous distributor side which is attached to the top of the distributor and extends downwardly from the top of the distributor so as to form a sealed volume between the top of the distributor and the side of the distributor; and
c) a plurality of distributor tubes which fluidly connect the area at or above the top of the distributor to the area below the top of the distributor;
wherein the top end of at least a portion of the distributor tubes terminates at or above a point located above the top of the distributor.

2. The fluid cracking regenerator vessel of claim 1, wherein the fluid cracking regenerator vessel is designed for a fluid catalytic cracking process.

3. The fluid cracking regenerator vessel of claim 1, wherein at least a portion of the distributor tubes extend from a point located at about the top of the distributor at one end of the distributor tube to a point located at about the bottom of the side of the distributor at the other end of the distributor tube.

4. The fluid cracking regenerator vessel of claim 1, wherein the bottom end of at least a portion of the distributor tubes terminates at a point located above the bottom of the side of the distributor.

5. The fluid cracking regenerator vessel of claim 1, wherein at least a portion of the distributor tubes have walls that are essentially non-porous.

6. The fluid cracking regenerator vessel of claim 1, wherein at least a portion of the distributor tubes are either wedge shaped or circular in cross-section.

7. The fluid cracking regenerator vessel of claim 1, wherein the perimeter of the top of the distributor is selected from a geometry that is substantially a circular or truncated-circular shape.

8. The fluid cracking regenerator vessel of claim 1, wherein there are from about 6 to about 50 distributor tubes.

9. The fluid cracking regenerator vessel of claim 8, wherein the distributor tubes are oriented in concentric rows from the center of the axis of the spent catalyst riser.

10. The fluid cracking regenerator vessel of claim 9, wherein there are from about 1 to about 5 concentric rows of tubes.

11. The fluid cracking regenerator vessel of claim 10, wherein distributor tubes have from about 2 to about 20 different cross-sectional square area values.

12. The fluid cracking regenerator vessel of claim 1, wherein the total cross sectional area of the distributor tubes is from about 10% to about 50% of the total planar area of the top of the distributor.

13. The fluid cracking regenerator vessel of claim 1, wherein the total cross-sectional area of the distributor tubes is from about 1 times to about 8 times the cross-sectional area of the spent catalyst riser.

14. The fluid cracking regenerator vessel of claim 1, further comprising an air grid and a regenerator vessel wall wherein the distributor is mechanically attached to the spent catalyst riser, the air grid, the regenerator vessel wall, or a combination thereof.

15. The fluid cracking regenerator vessel of claim 1, wherein the distributor is substantially open at the bottom.

16. A fluid cracking process, comprising:
  a) injecting a hydrocarbon feed through one or more feed nozzles connected to a fluid cracking reactor zone;
  b) contacting the hydrocarbon feed with a hot fluidized catalyst in the fluid cracking reactor zone to produce a cracked hydrocarbon product and a reaction catalyst;
  c) separating at least a portion of the cracked hydrocarbon product from the reaction catalyst; wherein the reaction catalyst contains hydrocarbon residue and coke products;
  d) stripping at least a portion of the reaction catalyst with a stripping fluid to remove at least a portion of the hydrocarbon residue from the reaction catalyst thereby producing a spent catalyst;
  e) passing at least a portion of the spent catalyst with a lift gas through a spent catalyst line to a spent catalyst riser;
  f) contacting the spent catalyst and lift gas exiting the spent catalyst riser with a distributor; and
  g) separating at least a portion of the spent catalyst from the lift gas through the distributor;
  wherein the distributor is fluidly attached to the discharge end of a spent catalyst riser, and the distributor is located in the dense phase catalyst bed of a fluid cracking regenerator vessel, and the distributor is comprised of:
  a top;
  a continuous distributor side which is attached to the top of the distributor and extends downwardly from the top of the distributor so as to form a sealed volume between the top of the distributor and the side of the distributor; and
  a plurality of distributor tubes which fluidly connect the area at or above the top of the distributor to the area below the top of the distributor;
  wherein the top end of at least a portion of the distributor tubes terminates at or above a point located above the top of the distributor.

17. The fluid cracking process of claim 16, wherein the fluid cracking process is a fluid catalytic cracking process.

18. The fluid cracking process of claim 17, wherein the temperature of the dense phase catalyst bed of the fluid cracking regenerator vessel is from about 1076° F. (580° C.) to about 1382° F. (750° C.), and the fluid cracking regenerator vessel is operated under partial burn conditions.

19. The fluid cracking process of claim 17, wherein the temperature of the dense phase catalyst bed of the fluid cracking regenerator vessel is from about 1076° F. (580° C.) to about 1382° F. (750° C.), and the fluid cracking regenerator vessel is operated under full burn conditions.

20. The fluid cracking process of claim 16, wherein a lift gas comprising air is injected into the spent catalyst line.

21. The fluid cracking process of claim 16, wherein at least a portion of the distributor tubes extend from a point located at about the top of the distributor at one end of the distributor tube to a point located at about the bottom of the side of the distributor at the other end of the distributor tube.

22. The fluid cracking process of claim 16, wherein the bottom end of at least a portion of the distributor tubes terminates at a point located above the bottom of the side of the distributor.

23. The fluid cracking process of claim 16, wherein at least a portion of the distributor tubes are either wedge shaped or circular in cross-section.

24. The fluid cracking process of claim 16, wherein the perimeter of the top of the distributor is selected from a geometry that is substantially a circular or truncated-circular shape.

25. The fluid cracking process of claim 16, wherein the total cross sectional area of the distributor tubes is from about 10% to about 50% of the total planar area of the top of the distributor.

26. The fluid cracking process of claim 16, wherein the total cross-sectional area of the distributor tubes is from about 1 times to about 8 times the cross-sectional area of the spent catalyst riser.

27. The fluid cracking process of claim 16, wherein the average velocity of the gases through the distribution tubes is from about 10% to about 100% of the gas velocity in the spent catalyst riser.

28. The fluid cracking process of claim 16, wherein the fluid cracking regenerator vessel is further comprised of at least two catalyst cyclone separators located in the upper section of the fluid cracking regenerator vessel, and the difference in temperature between the average temperatures of the catalyst cyclone separators and the temperature of the dense phase catalyst bed of the fluid cracking regenerator vessel is less than 15° C.

29. The fluid cracking process of claim 16, wherein the distributor is substantially open at the bottom.

30. The fluid cracking process of claim 29, wherein the spent catalyst and the lift gas flow downwardly inside the distributor.

* * * * *